United States Patent [19]

Cenker et al.

[11] 4,232,127
[45] * Nov. 4, 1980

[54] FURAN-MODIFIED ISOCYANURATE FOAMS

[75] Inventors: Moses Cenker, Trenton; Thirumurti L. Narayan, Riverview, both of Mich.

[73] Assignee: BASF Wyandotte Corporation, Wyandotte, Mich.

[*] Notice: The portion of the term of this patent subsequent to Jul. 15, 1992, has been disclaimed.

[21] Appl. No.: 534,559

[22] Filed: Dec. 19, 1974

[51] Int. Cl.$^3$ .............................................. C08G 18/14
[52] U.S. Cl. ..................................... 521/106; 521/119; 521/120; 521/121; 521/123; 521/130; 521/137; 521/158; 521/173; 521/174
[58] Field of Search ................. 260/2.5 AW, 2.5 AM, 260/2.5 BE; 521/106, 119, 120, 121, 123, 130, 137, 158, 173, 174

[56] References Cited

U.S. PATENT DOCUMENTS

| | | | |
|---|---|---|---|
| 3,509,103 | 4/1970 | Teague | 260/77.5 EB |
| 3,645,979 | 2/1972 | Liebsch | 260/2.5 AW |
| 3,894,972 | 7/1975 | Narayan | 260/2.5 AW |
| 3,922,238 | 11/1975 | Narayan | 260/2.5 BF |

OTHER PUBLICATIONS

Baker, "Preparation and Properties of Carbon Foam", Journal of Cellular Plastics, Nov./Dec. 1971, pp. 294–301.

Primary Examiner—Maurice J. Welsh
Attorney, Agent, or Firm—Joseph D. Michaels; Arnold S. Weintraub

[57] ABSTRACT

Furan-modified rigid isocyanurate foams are taught herein. The foams herein are prepared by either (1) the in situ polymerization of furfuryl alcohol and/or furfural during the foam formation reaction, or (2) the catalytic condensation of a furfuryl alcohol-blocked organic polyisocyanate.

12 Claims, No Drawings

FURAN-MODIFIED ISOCYANURATE FOAMS

BACKGROUND OF THE INVENTION

1. Field of the Invention

The present invention concerns rigid cellular products and methods of preparation therefor. More particularly, the present invention concerns rigid isocyanurate cellular products or foams and methods of preparation therefor. Even more particularly, the present invention concerns furan-modified isocyanurate rigid foams and methods of preparation therefor.

2. Prior Art

Recently there has been described the preparation of carbon foams from polyurethane-polyfurfuryl alcohol cellular products. See, Theoni et al, J. Cell Plas., 1971, p. 294–301. The foams produced hereby were found not to undergo fusion under intense heats, but, rather, retained their structural integrity, even in the carbonized state. This is attributable to the structure derived from the furan polymer in the preparation of the product.

Unmodified furan polymers are known to be chemically inert, heat resistant, infusible materials in the completely polymerized state. On ignition, the polymers char and retain their cellular structural integrity. The properties of furan resins are more completely discussed by Seigfried, "FURAN POLYMERS", Encyclopedia of Polymer Sci & Tech., Ed. N. M. Bikales, v. 7, 1967, pp. 432–435; Dunlop and Peters, "THE FURANS", Am. Chem. Soc. Monograph 119, Reinhold Pub. Corp., New York, 1953, pp. 774–790, and U.S. Pat. No. 3,681,286.

Other background art can be found in U.S. Pat. Nos. 3,538,035; 3,168,489, as well as U.S. Pat. No. 3,509,103 which teaches furan-modified polyurethane from furfuryl alcohol blocked polyisocyanates.

While isocyanurate foams have enjoyed relative popularity in recent times, there has been a dearth of art directed to capturing the advantages of other organic groups by incorporating same therewithin. U.S. Pat. No. 3,793,236 teaches oxazolidone-modified polyisocyanurate foams which incorporate oxazolidone groups into such foams. However, heretofore, there has not been taught the advantages accruing to the incorporation of furan or furan derivatives into isocyanurate rigid foams. It is to this to which the present invention is directed.

SUMMARY OF THE INVENTION

In accordance with the present invention there is provided furan-modified isocyanurate foams. These foams, which are self-blowing and which are rigid cellular products, are prepared either by (1) the in situ polymerization of furfuryl alcohol or furfural during isocyanurate foam formation, or (2) the catalytic trimerization of furfuryl alcohol-blocked polyisocyanates.

The in situ polymerization can be carried out in the presence or absence of an acid catalyst for the furfuryl alcohol or furfural polymerization. The foam formation reaction generally is initiated at room temperature. Any conventional organic polyisocyanate can be effectively utilized herein.

Any conventional isocyanate trimerization catalyst can be utilized to prepare the foams hereof. Additionally, supplemental ingredients, such as urethane catalysts, active hydrogen-containing compounds, auxiliary blowing agents, surfactants, plasticizers and the like, can be incorporated into the foam formulation to tailor the properties thereof.

For a more complete understanding of the present invention reference is made to the following detailed description and accompanying examples.

DESCRIPTION OF THE PREFERRED EMBODIMENTS

As noted heretofore, the present invention provides furan-modified isocyanurate foams. The foams hereof have the furan polymers directly incorporated into the isocyanurate back-bone are, indeed, furan-modified isocyanurate foams.

The foams hereof are prepared by either of one of two methods or processes. The first method generally comprises the in situ polymerization of furfuryl alcohol or furfural during the isocyanurate foam formation reaction. The second method generally comprises the preparation of the isocyanurate foam from furfuryl alcohol-blocked organic polyisocyanates.

For purposes of clarity, these two methods will be dealt with separate hereinafter.

At the outset, however, it should be noted that isocyanurate foams, per se, are generally prepared by the catalytic condensation of an organic polyisocyanate in the presence of a catalytically sufficient amount of an isocyanate trimerization catalyst.

Conventionally, blowing agents, such as, fluorocarbons or water are used to prepare the foam. However, and in accordance herewith the incorporation of furan polymers by using furfuryl alcohol provides a certain degree of self-blowing.

Useful organic polyisocyanates for the preparation of isocyanurate foams can be represented by the formula:

$$R(NCO)_z$$

wherein R is a polyvalent organic radical selected from the group consisting of aliphatic, aromatic, arylalkyl and alkylaryl organic radicals, as well as mixtures thereof; and Z is an integer corresponding to the valence number of R and is at least 2. Representative of the organic polyisocyanates contemplated herein include for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4''-triphenylmethane triisocyanate, the aromatic tetraisocyanates such as 4,4'-dimethyldiphenylmethane-2,2',5,5'-tetraisocyanate, and the like; aralkyl polyisocyanates, such as xylylene diisocyanate; aliphatic polyisocyanates, such as hexamethylene-1,6-diisocyanate, lysine diisocyanate methylester, isophorone diisocyanate, 2,4,4-trimethylhexamethylene-1,6-diisocyanate and the like, and mixtures thereof. Other useful organic polyisocyanates include: hydrogenated methylene diphenylisocyanate, m-phenylene diisocyanate, naphthylene-1,5-diisocyanate, 1-methoxyphenyl-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate, and the like.

These polyisocyanates are prepared by conventional methods in the art such as the phosgenation of the corresponding organic amine.

Still another class of organic polyisocyanates useful herein are isocyanate-terminated quasi-prepolymers. These quasi-prepolymers are prepared by reacting excess organic polyisocyanate or mixtures thereof with a minor amount of an active hydrogen-containing compound. Suitable active hydrogen-containing compounds for preparing the quasi-prepolymers hereof are those containing at least two active hydrogen-containing groups which are isocyanate reactive. Typifying such compounds are hydroxyl-containing polyesters, polyalkylene ether polyols, hydroxyl-terminated polyurethane polymers, polyhydric polythioethers, alkylene oxide adducts of phosphorus-containing acids, polyacetals, aliphatic polyols, aliphatic thiols including alkane, alkene and alkyne thiols having two or more —SH groups; as well as mixtures thereof. Compounds which contain two or more different groups within the above-defined classes may also be used such as, for example, compounds which contain one —SH group and —OH group.

Any suitable hydroxyl-containing polyester may be used such as are obtained, for example, from polycarboxylic acids and polyhydric alcohols. Any suitable polycarboxylic acid may be used as oxalic acid, malonic acid, succinic acid, glutaric acid, adipic acid, pimelic acid, suberic acid, azelaic acid, sebaic acid, brassylic acid, thapsic acid, maleic acid, fumaric acid, glutaconic acid, α-hydromuconic acid, β-hydromuconic acid, butyl-α-ethylglutaric acid, α,β-diethyl-succinic acid, phthalic acid, isophthalic acid, terephthalic acid, hemimellitic acid, and 1,4-cyclohexanedicarboxylic acid. Any suitable polydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, and sorbitol. Also included with the term "polyhydric alcohol" are compounds derived from phenol such as 2,2-bis(4-hydroxyphenyl) propane, commonly known as Bisphenol A.

Any suitable polyalkylene polyether polyol may be used such as the polymerization product of an alkylene oxide with a polyhydric alcohol. Any suitable polyhydric alcohol may be used such as those disclosed above for use in the preparation of hydroxyl-containing polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide tetrahydrofuran blends; epihalohydrins such as epichlorohydrin; as well as aralkylene oxides such as styrene oxide. The polyalkylene polyether polyols may have either primary or secondary hydroxyl groups, and preferably, are polyethers prepared from alkylene oxides having from two to six carbon atoms such as polyethylene ether glycols, polypropylene ether glycols, and polybutylene ether glycols. The polyalkylene polyether polyols may be prepared by any known process, such as, for example, the process disclosed in Wurtz in 1859 and Encyclopedia of Chemical Technology, vol 7, pp. 257–262, published by Interscience Publishers, Inc. (1957) or in U.S. Pat. No. 1,922,459.

Any suitable polyhydric polythioether may be used such as, for example, the condensation product of thiodiglycol or the reaction product of a dihydric alcohol such as is disclosed above for the preparation of the hydroxy-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxyl-containing polyester with only a portion of the components being a diamine such as ethylene diamine.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethanedithiol, 1,2-propanedithiol, 1,3-propanedithiol, and 1,6-hexanedithiol, alkene thiols such as 2-butene-1,4-dithiol, and alkyne thiols such as 3-hexyne-1,6-dithiol.

Other compounds which do not necessarily fit within any of the previously set forth classes of compounds which are quite suitable in the production of these other quasi-prepolymers compounds include the hydroxy-terminated polyurethane polymers such as a hydroxy-terminated polymer made by reacting the isocyanate with several moles of an alkylene glycol.

Any well-known isocyanate trimerization catalyst can be efficaciously deployed herein. Representative isocyanurate or isocyanate trimerization catalysts include 1,3,5-tris(3-dialkylaminoalkyl)-s-hexahydrotriazines, such as disclosed in U.S. Pat. No. 3,723,366; the isocyanate trimerization catalysts disclosed in U.S. Pat. No. 3,717,596; and those disclosed in U.S. Pat. No. 3,746,709. Other useful catalysts include the Mannich condensation products of phenol, formaldehyde and dialkylamines, such as 2,4,6-tris(dimethylaminomethyl)-phenol and potassium acetate. Still other useful catalysts include those found in Saunders and Frisch, v. 1 Polyurethanes, Chemistry and Technology, 1st Ed., Interscience Publishers, N.Y. 1962, pp. 94–95.

In preparing isocyanurate foams generally from about 0.5 to 10.0 parts, by weight, of catalyst per one hundred parts, by weight, of organic polyisocyanate are employed.

The present invention, it should be noted, does not deviate from the general mode of preparing isocyanurate foams, and any organic polyisocyanate and isocyanurate catalyst can be efficaciously employed herein.

A. IN SITU POLYMERIZATION

According to this method, furfuryl alcohol, furfural or both is polymerized contemporaneously with the foam formation condensation reaction. This is achieved by blending the furfuryl alcohols or furfural with the organic polyisocyanate, prior to or contemporaneous with the introduction of the isocyanate trimerization catalyst therewith.

The furfuryl alochol or furfural is employed in an amount ranging from about ten to fifty parts by weight thereof per one hundred parts by weight of organic polyisocyanate. Preferably, from about fifteen to about forty parts by weight of furfuryl alcohol and/or furfural is employed per one hundred parts by weight of organic polyisocyanate.

The in situ polymerization can be carried out in the presence or absence of an acid catalyst for promoting the furan polymerization. The catalyst, where used, is employed in an amount ranging from about one part to ten parts by weight thereof per one hundred parts by weight of furfuryl alcohol or furfural.

Typical useful acid catalysts include, for example, oxalic acid, (phosphoric acid, p-toluenesulfonic acid, methanesulfonic acid, sulfuric acid, hydrochloric acid and the like) acid chlorides such as acetyl chloride, benzoyl chloride, acid anhydrides, such as maleic anhydride, phthalic anhydride, phosphorus pentoxide. Also, Lewis acids, such as ferric chloride, stannic chloride and the like, can be used.

It should be noted that when the polyisocyanate, furan polymer-forming compound and acid catalyst are pre-blended together, the temperature of the reactants may rise. This mixture is cooled to ambient conditions prior to introducing the isocyanate trimerization catalyst thereinto.

In preparing the foams in accordance herewith the furan polymer-forming compound, organic polyisocyanate, acid catalyst, where used, and catalyst are admixed at room temperature whereat the foam forming reaction commences.

B. BLOCKED ISOCYANATE METHOD

According to this method some of the isocyanate groups of the organic polyisocyanate are blocked with furfuryl alcohol prior to the foam formation condensation reaction. This is achieved by utilizing a minor amount of furfuryl alcohol, and reacting it with the organic polyisocyanate to block from about 15 to 50% of the isocyanate groups. Generally, from about one to twenty-five parts by weight of furfuryl alcohol per one hundred parts by weight of organic polyisocyanate are employed. Preferably, from about five to twenty parts by weight of furfuryl alcohol per one hundred parts by weight of organic polyisocyanate are employed. The reaction proceeds at a temperature of from about 50° C. to about 100° C. for about one to three hours.

The reaction can be carried out, optionally, in the presence of a urethane catalyst. The isocyanate trimerization reaction can be carried out in the presence or absence or an acid catalyst, such as those hereinbefore enumerated and in the same quantities.

In preparing the instant foam compositions additional ingredients can be employed, such as urethane catalysts, active hydrogen-containing compounds, auxiliary blowing agents, surfactants, plasticizers and the like.

Useful urethane catalysts include, for example, tertiary amines and metallo-organic salt catalysts which are polyvalent metal salts of an organic acid having up to about eighteen carbon atoms and being void of active hydrogen atoms. The organic portion of the salt may be either linear, or cyclic, saturated or unsaturated. The polyvalent metal has a valence of from about two to four.

Representative tertiary amines include, for example, diethylene triamine ketimine, tetramethylethylene diamine, triethylene diamine, tetramethylbutane diamine, tetramethyl guanidine, trimethylpiperazine and the like.

Typical organo-metallic salt catalysts include stannous acetate, stannous butyrate, stannous 2-ethylhexoate, stannous pentane carboxylate, cadmium cyclohexane carboxylate, lead naphthenate, lead octoate, cobalt naphthenate, zinc napthenate, bis(phenylmercurydodecyl) succinate, phenylmercuric benzoate, cadmium naphthenate, dibutyltin dilaurate, dibutyltin diacetate, and dibutyltin di-2-ethylhexanoate.

The urethane catalyst, where used, is employed in an amount ranging from about one-tenth to ten parts by weight thereof, and, preferably, from about one to five parts by weight thereof per one hundred parts by weight of organic polyisocyanate. According to the present invention, where used, the urethane catalyst is used in a blend with the isocyanate trimerization catalyst.

Suitable active hydrogen-containing compounds include those enumerated hereinbefore with respect to the preparation of the quasi-prepolymers. Generally, useful additional active hydrogen-containing compounds are those polyols having an average functionality of from about two to eight and an average hydroxyl equivalent weight of from about 150 to 3,000. Usually, from about 0.01 to 0.2 equivalents, based on the equivalent weight of the polyisocyanate, are employed. Where used, the active hydrogen-containing compound is pre-blended with the isocyanate trimerization catalyst.

Useful surfactants include the commerically available alkyl polysiloxanes and polyalkyl siloxane surfactants. Where used, the surfactant is, also, pre-blended with the isocyanate trimerization catalyst. Plasticizers, such as tris(2-chloroethyl)phosphate, where utilized, are also, pre-blended with the isocyanate trimerization catalyst.

The auxiliary blowing agents, which are employed for density control, which can be used herein are the halohydrocarbon blowing agents. Normally, the auxiliary blowing agents are pre-blended with the organic polyisocyanate.

The foams produced in accordance herewith are rigid foams having a density of from about one-half to three pounds per cubic foot or higher. Under flame tests the foams hereof char, but retain their cellular structural integrity without undergoing fusion.

For a more complete understanding of the present invention reference is made to the following specific examples. In the examples, which are illustrative, rather than limitative of the invention, all parts are by weight, absent indications to the contrary.

EXAMPLE I

This example illustrates the preparation of a furan-modified isocyanurate foam in accordance with the present invention by the in situ polymerization of furfuryl alcohol.

Into a first vessel was added, with stirring, three hundred parts of crude methylene diphenyldiisocyanate and one hundred ten parts of furfuryl alcohol.

In a second vessel there was blended six parts of 1,3,5-tris(3-dimethylaminopropyl)-s-hexahydrotriazine, and isocyanate trimerization catalyst, and three parts of a polysiloxane surfactant sold by Dow Corning under the name DC-193.

In a third vessel was placed three parts of stannic chloride.

At room temperature, into a fourth vessel, equipped with agitation means, was simultaneously added, with agitation, the ingredients of the first three vessels. The ingredients were vigorously stirred until foam formation commenced.

In preparing the foam there was observed a cream time of ten seconds, a rise time of seventy seconds and a period of seventy seconds until the foam was tack free.

There was, thus, obtained a rigid cellular furan-modified isocyanurate foam having a density of 1.2 pcf.

EXAMPLES II-IV

These examples further illustrate the preparation of a furan-modified isocyanate foam by the in situ polymerization of furfuryl alcohol during foam formation.

Into a first vessel equipped with stirring means was pre-blended three hundred parts of crude methylene diphenyldiisocyanate, forty-five parts of furfuryl alcohol and three parts of phosphorus pentoxide, as an acid catalyst. With mixing the temperature in the vessel reached 43° C. The mixture was then cooled to room temperature and forty-five parts of stabilized fluorotrichloromethane blowing agent was blended therewith, to prepare a first blend.

In a second vessel there was prepared a second blend of four and one-half parts of 1,3,5-tris(3-dimethylaminopropyl)-s-hexahydrotriazine and three parts of the DC-193 surfactant.

At room temperature and with stirring the two blends were mixed together until foam formation commenced. There was an observed cream time of seven seconds, a rise time of ninety seconds, and a tack free time of fifty seconds. The so-obtained furan modified-isocyanurate foam had a density of 2.4 pcf.

This procedure was, then, repeated, but wherein the first blend contained fifty-five parts of 1,1,2-trifluoro-1,2,2-trichloroethane as the blowing agent in lieu of the stabilized halogenated methane and the second blend contained six parts of a polyol comprising the Mannich condensation product of phenol, formaldehyde, ethanolamine and propylene oxide which is sold commercially by Jefferson Chemical under the name THANOL R-350X, as well as six-tenth part of dibutyltin diacetate, a urethane catalyst, and no surfactant.

The foam obtained hereby had a cream time of five seconds, a rise time of ninety seconds and a tack free time of one hundred fifty seconds. The foam had a density of 1.9 pcf.

The procedure was, again, repeated, but wherein the first blend contained sixty parts of furfuryl alcohol and six parts of phosphorus pentoxide. The temperature in the vessel reached 50° C. upon mixing. When the mixture was cooled to room temperature, fifty-five parts of the stabilized fluorotrichloromethane was blended therewith. The second blend contained fifteen parts of the THANOL R-350X polyol, four and one-half parts of the hexahydrotriazine and three parts of the DC-193 surfactant.

The foam prepared in this manner had a density of 1.9 pcf., a cream time of ten seconds, a rise time of one hundred seconds and a tack free time of two hundred fifty seconds.

EXAMPLE V

This example illustrates a further mode of preparation of a furan modified-isocyanurate foam by the in situ polymerization technique.

Into a first vessel was blended, with stirring, one hundred parts of crude methylene diphenyldiisocyanate, ten parts of stablized fluorotrichloromethane blowing agent and one part of methanesulfonic acid, as an acid catalyst.

In a second vessel there was prepared a second blend of thirty-seven parts of furfuryl alcohol, one-half part of dibutyltin diacetate and one and one-half parts of the DC-193 surfactant.

The two blends were then mixed together at room temperature with vigorous agitation until foam formation commenced. The resulting foam had a density of 0.6 pcf., an observed cream time of one hundred five seconds, a rise time of two hundred ten seconds and a tack free time of one hundred eighty seconds.

EXAMPLES VI-XII

The following examples further illustrate the preparation of a furan modified-isocyanurate foam by the in situ polymerization of furfuryl alcohol during foam formation.

Into a first reaction vessel was blended a predetermined quantity of organic polyisocyanate, and an auxiliary blowing agent. This blend was maintained at 10° C., until just prior to foaming.

In a second vessel there was blended together predetermined quantities of furfuryl alcohol, an isocyanate trimerization catalyst, a urethane catalyst, a plasticizer, a surfactant and a polyol.

In a third vessel the two blends were vigorously mixed together until foam formation commenced. There was, thus, obtained rigid furan modified-isocyanurate foams by the in situ polymerization of furfuryl alcohol during foam formation.

The following table, Table I, sets forth the ingredients, and amounts used to prepare the foams.

TABLE I

| Foam | Isocyanate[1] | FA[2] | TDH[3] | DBTDL[4] | Plasticizer[5] | Surfactant[6] | Polyol[7] | Blowing agent[8] |
|---|---|---|---|---|---|---|---|---|
| Ex. VI | 300 | 9 | 4.5 | 3 | 4.5 | 3 | 60 | 55 |
| Ex. VII | 300 | 15 | 4.5 | 3 | 4.5 | 3 | 60 | 55 |
| Ex. VIII | 300 | 21 | 4.5 | 3 | 4.5 | 3 | 60 | 55 |
| Ex. IX | 300 | 27 | 4.5 | 3 | 4.5 | 3 | 60 | 55 |
| Ex. X | 300 | 33 | 4.5 | 3 | 4.5 | 3 | 60 | 55 |
| Ex. XI | 300 | 39 | 4.5 | 3 | 4.5 | 3 | 60 | 52 |

TABLE I-continued

| Foam | Isocyanate[1] | FA[2] | TDH[3] | DBTDL[4] | Plasticizer[5] | Surfactant[6] | Polyol[7] | Blowing agent[8] |
|---|---|---|---|---|---|---|---|---|
| Ex. XII | 300 | 45 | 4.5 | 3 | 4.5 | 3 | 60 | 55 |

[1] crude methylene diphenyldiisocyanate
[2] furfuryl alcohol
[3] 1,3,5-tris(3-dimethylaminopropyl)-s-hexahydrotriazine
[4] dibutyltin dilaurate
[5] tris(2-chloroethyl)phosphate
[6] a polysiloxane surfactant sold by Dow Corning under the name DC-193
[7] a propylene oxide adduct of propylene glycol having a hydroxyl number of about 145
[8] stabilized fluorotrichloromethane The above-prepared foams had the following observed cream rise, tack free times and densities:

| Foam | Cream Time, sec. | Rise Time, sec. | Tack Free Time, sec. | Density, pcf. |
|---|---|---|---|---|
| Ex. VI | 14 | 45 | 130 | 2.2 |
| EX. VII | 10 | 35 | 90 | 2.1 |
| EX. VIII | 9 | 30 | 90 | 2.0 |
| EX. IX | 6 | 30 | 90 | 2.0 |
| EX. X | 4 | 25 | 85 | 2.0 |
| EX. XI | 4 | 25 | 60 | 1.9 |
| EX. XII | 4 | 25 | 45 | 1.8 |

The foams of Examples VI–XII were tested for physical properties by the following test procedure:

| | |
|---|---|
| Compressive Strength, 10% Deflection, psi. | ASTM D-1621 |
| Tumbling Friability, | ASTM C-421 |
| % Weight Loss Flame Retardancy- | ASTM D-3014 |
| Butler Chimney Test | |

The results of these tests are set forth below in Table II.

TABLE II

| Foam | Comp. Str., 10% Defl, psi | Tumb. Friab, % Wt. Loss | Closed Cell Content % | Butler Chimney Test | | | |
|---|---|---|---|---|---|---|---|
| | | | | % Wt. Ret. | Flame Ht, in. | Time to SX,[1] Sec. | Smoke |
| EX. VI | 26 | 30 | 99 | 94 | 6 | 10 | Med |
| EX. VII | 22 | 28 | 100 | 93 | 5 | 10 | Med |
| EX. VIII | 19 | 30 | 99 | 95 | 6 | 10 | Med |
| EX. IX | 22 | 30 | 100 | 93 | 7 | 10 | Med |
| EX. X | 31 | 34 | 100 | 94 | 7 | 10 | Med |
| EX. XI | 22 | 38 | 99 | 94 | 7 | 10 | Med |
| EX. XII | 17 | 38 | 101 | 95 | 7 | 10 | Med |

[1] Self-extinguishment

It is thus seen that excellent rigid foams are prepared hereby.

EXAMPLES XIII–XXIII

These examples illustrate the preparation of a furan modified-isocyanurate foam by the in situ polymerization of furfuryl alcohols during foam formation.

Following the procedure outlined with respect to Examples VI–XII, a series of furan modified-isocyanurate foams were prepared. However, pre-blended with the isocyanate was a pre-determined quantity of ferric chloride as an acid catalyst.

The following table, Table III, sets forth the ingredients and amounts used to prepare the foams.

TABLE III

| Foam | CMDI[1] | TDI[2] | FA[3] | TDH[4] | DBTDL[5] | FeCl3 | Plasticizer[6] | Surfactant[7] | Polyol[8] | Blowing agent[9] |
|---|---|---|---|---|---|---|---|---|---|---|
| Ex. XIII | 300 | 0 | 21 | 4.5 | 3 | 1 | 4.5 | 3 | 60 | 55 |
| Ex. XIV | 270 | 30 | 21 | 4.5 | 3 | 1 | 4.5 | 3 | 60 | 55 |
| Ex. XV | 300 | 0 | 21 | 4.5 | 3 | 1 | 4.5 | 3 | 66 | 55 |
| Ex. XVI | 270 | 30 | 21 | 4.5 | 3 | 1 | 4.5 | 3 | 66 | 55 |
| Ex. XVII | 300 | 0 | 21 | 4.5 | 3 | 1 | 4.5 | 3 | 75 | 55 |
| Ex. XVIII | 270 | 30 | 21 | 4.5 | 3 | 1 | 4.5 | 3 | 75 | 55 |
| Ex. XIX | 270 | 30 | 33 | 4.5 | 3 | 3 | 4.5 | 3 | 60 | 52 |
| Ex. XX | 300 | 0 | 33 | 4.5 | 3 | 3 | 4.5 | 3 | 66 | 55 |
| Ex. XXI | 270 | 30 | 33 | 4.5 | 3 | 3 | 4.5 | 3 | 66 | 52 |
| Ex. XXII | 300 | 0 | 33 | 4.5 | 3 | 3 | 4.5 | 3 | 75 | 55 |
| Ex. XXIII | 270 | 30 | 33 | 4.5 | 3 | 3 | 4.5 | 3 | 75 | 52 |

[1] crude methylene diphenyldiisocyanate
[2] an 80:20 weight mixture of 2,4- and 2,6-toluene diisocyanate
[3] furfuryl alcohol
[4] 1,3,5-tris(3-dimethylaminopropyl)-s-hexahydrotriazine
[5] dibutyltin dilaurate
[6] tris(2-chloroethyl)phosphate
[7] a polysiloxane surfactant sold by Dow Corning under the name DC-193
[8] Same as footnote 7 in Examples VI–XII
[9] Same as footnote 8 in Examples VI–XII The foams of Examples XIII–XXIII were tested for physical properties in the same manner heretofore described with reference to Examples VI–XII. The results of these tests are set forth below in Table IV.

TABLE IV

| Foam | Density pcf. | Comp. Str, 10% Defl. psi | Tumb. Friab, % Wt. Loss | Closed Cell Cont, % | Butler Chimney Test | | | |
|---|---|---|---|---|---|---|---|---|
| | | | | | % Wt. Ret. | Flame Ht. In. | Time To SX, Sec. | Smoke |
| Ex. XIII | 2.1 | 22 | 30 | 100 | 94 | 5 | 10 | Lt. to Med. |
| Ex. XIV | 1.9 | 20 | 34 | 99 | 95 | 5 | 10 | Lt. to Med. |
| Ex. XV | 2.1 | 24 | 24 | 99 | 93 | 6 | 10 | Lt. to Med. |
| Ex. XVI | 1.9 | 19 | 30 | 97 | 94 | 6 | 10 | Lt. to Med. |
| Ex. XVII | 2.1 | 23 | 22 | 98 | 92 | 7 | 10 | Lt. to Med. |
| Ex. XVIII | 2.0 | 19 | 26 | 96 | 92 | 7 | 10 | Lt. to Med. |
| Ex. XIX | 1.7 | 17 | 51 | 98 | 89 | 8 | 10 | Lt. to Med. |
| Ex. XX | 1.8 | 18 | 37 | 98 | 92 | 8 | 10 | Lt. to Med. |
| Ex. XXI | 1.8 | 16 | 52 | 94 | 93 | 7 | 10 | Lt. to Med. |
| Ex. XXII | 1.9 | 16 | 33 | 98 | 91 | 8 | 10 | Lt. to Med. |
| Ex. XXIII | 1.7 | 13 | 41 | 97 | 90 | 8 | 10 | Lt. to Med. |

EXAMPLES XXIV–XXIX

A further series of furan modified-isocyanurate foams were prepared by the in situ polymerization of furfuryl alcohol during foam formation following the procedure of Examples VI–XII. However, in preparing these foams, the cooled organic polyisocyanate was pre-blended with a pre-determined quantity of benzoyl chloride as an furfuryl alcohol polymerization catalyst.

All the other ingredients employed were the same as those employed in Examples VI–XII.

The following table, Table V, sets forth the ingredients and amounts thereof used to prepare the foams.

TABLE V

| Foam | CMDI | FA | TDH | DBTDL | Plasti- cizer | Surfac- tant | Benzoyl Chloride | Polyol | Blowing Agent |
|---|---|---|---|---|---|---|---|---|---|
| Ex. XXIV | 300 | 21 | 4.5 | 3 | 4.5 | 3 | 1.0 | 60 | 55 |
| Ex. XXV | 300 | 21 | 4.5 | 3 | 4.5 | 3 | 1.0 | 66 | 55 |
| Ex. XXVI | 300 | 21 | 4.5 | 3 | 4.5 | 3 | 1.0 | 75 | 55 |
| Ex. XXVII | 300 | 33 | 4.5 | 3 | 4.5 | 3 | 1.5 | 60 | 55 |
| Ex. XXVIII | 300 | 33 | 4.5 | 3 | 4.5 | 3 | 1.5 | 66 | 55 |
| Ex. XXIX | 300 | 33 | 4.5 | 3 | 4.5 | 3 | 1.5 | 75 | 55 |

The foams had the following observed cream times, rise times, tack free times and densities:

| Foam | Cream Time, Sec. | Rise Time, Sec. | Tack Free Time, Sec. | Density pcf. |
|---|---|---|---|---|
| Ex. XXIV | 10 | 50 | 140 | 1.9 |
| Ex. XXV | 10 | 50 | 135 | 2.0 |
| Ex. XXVI | 10 | 45 | 125 | 2.1 |
| Ex. XXVII | 5 | 40 | 90 | 1.9 |
| Ex. XXVIII | 5 | 50 | 90 | 1.8 |
| Ex. XXIX | 5 | 45 | 90 | 1.9 |

The foams were then tested for physical properties in accordance with the methods described heretofore. The results of these tests are set forth hereinafter in Table VI.

TABLE VI

| Foam | Comp. Str, 10% Defl, psi | Tumb. Friab, % Wt. Loss | Closed Cell Content % | Butler Chimney Test | | |
|---|---|---|---|---|---|---|
| | | | | % Wt. Ret. | Flame Ht. in. | Time to SX, sec. |
| Ex. XXIV | 16 | 53 | 96 | 85 | 9 | 13 |
| Ex. XXV | 21 | 49 | 98 | 89 | 7 | 10 |
| Ex. XXVI | 22 | 37 | 98 | 91 | 9 | 10 |
| Ex. XXVII | 19 | 58 | 98 | 92 | 6 | 10 |
| Ex. XXVIII | 18 | 56 | 96 | 89 | 9 | 10 |
| Ex. XXIX | 19 | 47 | 96 | 92 | 7 | 10 |

It is, again, seen that excellent foams are obtained hereby.

EXAMPLE XXX

A furfuryl alcohol blocked polyisocyanate was prepared by the following procedure:

One thousand grams (7.26 equivalents) of crude methylene diphenyldiisocyanate and 1.0 g. of dibutyltin diacetate was charged into a two-liter reaction vessel equipped with an addition funnel, stirrer, reflux condenser, nigrogen gas inlet, and a thermometer. Furfuryl alcohol (200 g., 2.04 equivalents) was added dropwise over a period of one hour during which time the temperature in the vessel rose to 81° C. After the exothermic reaction subsided, the reaction contents were further heated for 1 hour. After cooling there was obtained a blocked isocyanate for which the available isocyanate groups were determined. It was found to be 18.14% (theory 18.27%). The Brookfield viscosity of the product was 166,000 cps. at 25° C.

EXAMPLES XXXI–XXXV

A series of foams was prepared from the furfuryl alcohol blocked polyisocyanate of Example XXV by the following procedure:

In a first reaction vessel was blended a predetermined quantity of blocked polyisocyanate and furan polymerization catalyst. In a second vessel was blended together predetermined quantities of isocyanate trimerization catalyst and surfactant. The two blends were vigorously mixed together until foam formation commenced.

The following table, Table VII, sets forth the ingredients and amounts used to prepare the foams.

TABLE VII

| Foam | Isocy-anate[1] | TDH[2] | Surfac-tant[3] | Blowing agent[4] | Furan Catalyst |
|---|---|---|---|---|---|
| XXXI | 100 | 6 | 1 | 18 | none |
| XXXII | 300 | 18 | 3 | 58 | 3 (benzoyl chloride) |
| XXXIII | 100 | 6 | 1 | 18 | 0.5 (ferric chloride) |
| XXXIV | 100 | 6 | 1 | 18 | 1 (phosphorus pentoxide) |
| XXXV | 100 | 6 | 1 | 18 | 2 (maleic anhydride) |

[1]Furfuryl alcohol blocked isocyanate of Example XXV
[2]1,3,5-tris(3-dimethylaminopropyl)-s-hexahydrotriazine
[3]Dow Corning silicone surfactant
[4]Stabilized flurotrichloromethane The above prepared foams had the following observed cream times, rise times, tack free times and densities.

| Foam | Cream Time, Sec. | Rise Time, Sec. | Tack Free Time, Sec. | Density, pcf. |
|---|---|---|---|---|
| XXXI | 120 | 145 | 140 | 4.2 |
| XXXII | 45 | 285 | 185 | 2.4 |
| XXXIII | 75 | 300 | 165 | 2.5 |
| XXXIV | 60 | 260 | 150 | 2.6 |
| XXXV | 45 | 660 | 270 | 2.3 |

Foam XXXII exhibited the following physical properties:
  Compr. Str. at 10% defl., psi.—35
  Closed Cells, %—86
  Friability, wt. Loss, %—49
  Butler Chimney Test
  Wt. retained, %—86
  Flame height, in.—9
  Time to SX, sec.—10

EXAMPLE XXXVI

Following the procedure of Example XXX another furfuryl alcohol-blocked polyisocyanate was prepared from 1000 g. (7.26 eq.) of CMDI, 1.0 g. of DBTDA, as a catalyst, and 100 g. (1.02 eq.) of furfuryl alcohol. The viscosity of the product was 5,280 cps. at 25° C. The amount of available isocyanate was found to be 23.82%.

EXAMPLES XXXVI-XXXXI

A further series of foams was prepared from the furfuryl alcohol blocked polyisocyanate of Example XXXVI following the procedure outlined with respect to Examples XXXI to XXXV.

The following table, Table VIII, sets forth the ingredients and amounts used to prepare the foams.

TABLE VIII

| Foam | Isocy-anate | TDH | Surfac-tant | Blowing Agent | Furan Catalyst |
|---|---|---|---|---|---|
| XXXVII | 100 | 6 | 1 | 18 | none |
| XXXVIII | 300 | 18 | 3 | 58 | 3 (phorsphorus pentoxide) |
| XXXIX | 100 | 6 | 1 | 18 | 0.5 (ferric chloride) |
| XXXX | 100 | 6 | 1 | 18 | 1.0 (benzoyl chloride) |
| XXXXI | 100 | 6 | 1 | 18 | 2.0 (maleic chloride) |

Each of the above prepared foams had the following observed cream times, rise times, tack free times and densities.

| Foam | Cream Time, Sec. | Rise Time, Sec. | Tack Free Time, Sec. | Density, pcf. |
|---|---|---|---|---|
| XXXVII | 100 | 220 | 175 | 2.5 |
| XXXVIII | 95 | 245 | 160 | 2.1 |
| XXXIX | 80 | 220 | 160 | 2.5 |
| XXXX | 80 | 180 | 135 | 2.6 |
| XXXXI | 75 | 480 | 300 | 2.6 |

Foam XXXVIII displayed the following physical properties.
  Compr. Str. at 10% defl., psi.—43
  Closed Cells, %—85
  Friability, wt. loss, %—45
  Butler Chimney Test
  Wt. Retained, %—93
  Flame height, in.—5
  Time to SX, sec.—10

Having, thus, described the invention what is claimed is:

1. A composition of matter consisting essentially of: an isocyanurate rigid foam having furan linkages bound to the backbone of the isocyanurate foam structure.

2. A process for the manufacture of a foam product consisting essentially of an isocyanurate foam having furan linkages bound to the backbone of the isocyanurate foam structure, comprising:
    catalytically condensing a previously prepared furfuryl alcohol-blocked organic polyisocyanate in the presence of a catalytically sufficient amount of an isocyanate trimerization catalyst.

3. The process of claim 2 wherein the isocyanate trimerization catalyst is used conjointly with an acid catalyst.

4. The process of claim 3 wherein the acid catalyst is employed in an amount ranging from about one to ten parts by weight thereof per one hundred parts by weight of furfuryl alcohol.

5. The process of claim 2, wherein the organic polyisocyanate corresponds to the formula:

$$R(NCO)_Z$$

wherein R is a polyvalent organic radical selected from the group consisting of aliphatic and aromatic hydrocarbon organic radicals, as well as mixtures thereof; and Z is an integer corresponding to the valence of R and is at least 2.

6. The process of claim 5 wherein the organic polyisocyanate is selected from the group consisting of crude methylene diphenyldiisocyanate, toluene diisocyanate and mixtures thereof.

7. A process for the manufacture of a foam product consisting essentially of an isocyanurate foam having furan linkages bound to the backbone of the isocyanurate foam structure, comprising:
    polymerizing in situ either furfuryl alcohol or furfural contemporaneous with the trimerization of an organic polyisocyanate in the presence of an isocyanate trimerization catalyst, the furfuryl alcohol or furfural being present in an amount ranging from about fifteen to fifty parts by weight thereof per one hundred parts by weight of the organic polyisocyanate.

8. The process of claim 7 wherein the isocyanate trimerization catalyst is used conjointly with an acid catalyst.

9. The process of claim 8 wherein the acid catalyst is employed in an amount ranging from about one to ten parts by weight thereof per one hundred parts by weight of furfuryl alcohol.

10. The process of claim 7 wherein the organic polyisocyanate corresponds to the formula:

R(NCO)$_Z$ wherein R is a polyvalent organic radical selected from the group consisting of aliphatic and aromatic hydrocarbon organic radicals, as well as mixtures thereof; and Z is an integer corresponding to the valence of R and is at least 2.

11. The process of claim 10 wherein the organic polyisocyanate is selected from the group consisting of crude methylene diphenyldiisocyanate, toluene diisocyanate and mixtures thereof.

12. A process for the manufacture of a foam product consisting essentially of an isocyanurate foam having furan linkages bound to the backbone of the isocyanurate foam structure, comprising:

polymerizing in situ either furfuryl alcohol or furfural contemporaneous with the trimerization of an organic polyisocyanate in the presence of an isocyanate trimerization catalyst and an acid catalyst.

* * * * *